No. 803,142. PATENTED OCT. 31, 1905.
H. D. WARD.
SHOVEL.
APPLICATION FILED JUNE 17, 1905.

Witnesses
Roy D. Tolman.
Penelope Comberbach

Inventor
Henry D. Ward.
By Rufus B. Fowler,
Attorney

UNITED STATES PATENT OFFICE.

HENRY D. WARD, OF WORCESTER, MASSACHUSETTS, ASSIGNOR OF ONE-HALF TO WILLIAM L. CARRICK, OF WORCESTER, MASSACHUSETTS.

SHOVEL.

No. 803,142.　　　Specification of Letters Patent.　　　Patented Oct. 31, 1905.

Application filed June 17, 1905. Serial No. 265,689.

*To all whom it may concern:*

Be it known that I, HENRY D. WARD, a citizen of the United States, residing at Worcester, in the county of Worcester and Commonwealth of Massachusetts, have invented a new and useful Improvement in Shovels, of which the following is a specification, accompanied by drawings forming a part of the same, in which—

Figure 1:
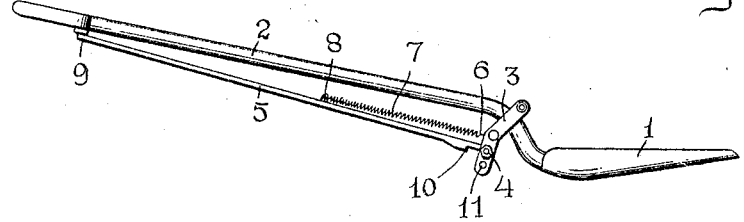
Figure 2:
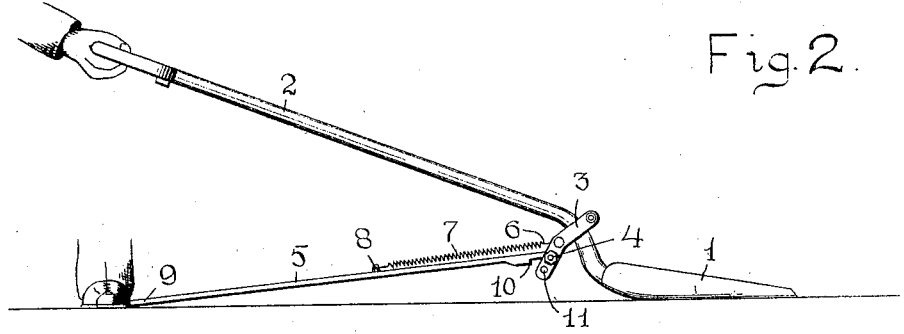
Figure 3:
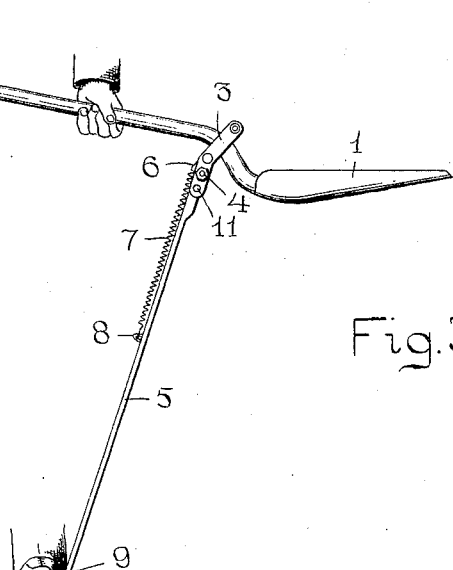

Figure 1 is a side view of my improved shovel. Fig. 2 is the same in position to lift a load, and Fig. 3 is the same in its elevated position.

Similar reference-figures refer to similar parts in the different views.

My invention relates to that class of shovels which are provided with rods or fulcrums which assist in lifting the load upon the shovel; and it consists in the construction and arrangement of parts, as hereinafter described, and pointed out in the annexed claims.

Referring to the accompanying drawings, 1 denotes the shovel, and 2 the handle. The bracket 3 is clamped to the handle near the shovel, and near its outer end at 4 is pivotally fastened a rod 5. One end 6 of a spiral spring 7 is attached to the bracket 3 between the pivot 4 and the handle of the shovel, with the other end 8 of the spring 7 fastened to the rod 5 at some distance from the pivot 4. When the shovel is not in use, the rod 5 rests with its free end 9 in contact with the handle 2, as shown in Fig. 1. The rod 5 is also provided near the pivot 4 with a shoulder 10, which engages a pin 11 near the end of the bracket 3 when the shovel is in its elevated position, as shown in Fig. 3, preventing further rotation of the rod 5 about the pivot 4 and causing the weight of the load to be supported on the shoulder 10. When the rod 5 is in the position shown in Fig. 1, with its free end 9 resting against the handle of the shovel, the tension of the spring 7 while exerted toward the bracket 3 holds the rod 5 in contact with the handle 2, since the line of tension of the spring not being parallel with the rod part of the force of the spring is exerted to draw the rod upward toward the handle. The stiffness of the spring 7 is so regulated that after the end 9 of the rod 5 is moved a certain distance downward away from the handle 2 the weight of the rod is sufficient to overcome the upward force exerted by the spring, as the lifting power of the spring is constantly lessened as the line of strain approaches the axis of the rod—that is, by the revolution of the rod 5 about its pivot 4 downward away from the handle 2 the line of strain of the spring gradually becomes parallel to the rod 5, and hence the upward force exerted by the spring 7 upon the free end 9 of the rod is gradually diminished, soon becoming too weak to overcome the weight of the rod. The distance from the handle at which this occurs is determined by the power of the spring, and when this distance is passed the rod 5 drops by its own weight, as shown in Fig. 2. The shovel is then raised upon the rod as a fulcrum until the shoulder 10 engages the pin 11, at which position the line of tension of the spring 7 is parallel with the rod. The shovel is then at its highest position, and its load may be disposed of as required. The pin 11 prevents further revolution of the rod 5 about the pivot 4, so that the movement of the rod 5 is limited to the arc between the positions shown in Figs. 1 and 3. The motion of the rod 5 is now reversed and the rod lifted again into contact with the handle 2, the spring 7 assisting this movement and holding the rod in such contact.

In using the shovel the operator, first securing the desired load, moves the rod 5 downward away from the handle a sufficient distance to overcome the force exerted by the spring 7 and the rod 5 drops. A suitable brace having been furnished by the foot or otherwise for the free end 9 of the rod, the shovel is raised upon the rod as a fulcrum to the point desired and the load disposed of. The spring 7 holds the rod securely against the handle after the rod has been returned into contact therewith until the operation is repeated.

What I claim as my invention, and desire to secure by Letters Patent, is—

1. In a shovel, the combination with a handle, of a bracket attached to said handle, a fulcrum-rod pivoted in said bracket and a spring having one end attached to said rod and the other to said bracket between the pivoted end of said rod and said handle.

2. In a shovel, the combination with a handle, a bracket attached to said handle, a fulcrum-rod pivoted in said bracket, a spring having one end attached to said rod and the other to said bracket between the pivoted end of said rod and said handle, and means for limiting the revolution of said rod about said pivot.

3. In a shovel, the combination with a handle, of a bracket attached to said handle, a fulcrum-rod pivoted in said bracket, and means for holding the free end of said rod in contact with said handle.

4. In a shovel, the combination with a handle, of a bracket attached to said handle, a fulcrum-rod pivoted in said bracket, and a spring having its line of tension angular with said rod when the free end of said rod is in contact with said handle.

5. In a shovel, the combination with a handle, of a fulcrum-rod pivotally attached to said handle, means for exerting the force necessary for holding the free end of said rod in contact with said handle, with said force gradually diminishing as said rod is moved away from said handle.

6. In a shovel, the combination with a handle and a bracket attached thereto, of a fulcrum-rod pivotally attached to said bracket, a pin carried by said bracket and a shoulder on said fulcrum-rod arranged to contact with said pin and support the load upon the shovel.

Dated this 14th day of June, 1905.

HENRY D. WARD.

Witnesses:
 PENELOPE COMBERBACH,
 RUFUS B. FOWLER.